United States Patent
Mancini

(10) Patent No.: US 8,960,254 B2
(45) Date of Patent: *Feb. 24, 2015

(54) METHOD AND PLANT FOR MANUFACTURING TYRES FOR VEHICLE WHEELS

(75) Inventor: Gianni Mancini, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/491,152

(22) Filed: Jun. 7, 2012

(65) Prior Publication Data

US 2012/0279661 A1    Nov. 8, 2012

Related U.S. Application Data

(62) Division of application No. 11/791,863, filed as application No. PCT/IT2004/000699 on Dec. 16, 2004, now Pat. No. 8,226,785.

(51) Int. Cl.
| | |
|---|---|
| B29D 30/20 | (2006.01) |
| B29D 30/24 | (2006.01) |
| B29D 30/30 | (2006.01) |

(52) U.S. Cl.
CPC ............. *B29D 30/20* (2013.01); *B29D 30/242* (2013.01); *B29D 2030/241* (2013.01); *B29D 30/3028* (2013.01); *B29D 2030/206* (2013.01); *B29D 2030/207* (2013.01); *B29D 2030/208* (2013.01)
USPC ............................. 156/396; 156/111; 156/397

(58) Field of Classification Search
CPC .. B29D 30/60; B29D 30/005; B29D 30/3028; B29D 2030/202; B29D 2030/206; B29D 2030/207; B29D 2030/208; B29D 2030/241
USPC ......................... 156/111, 117, 130, 396, 397
See application file for complete search history.

(56) References Cited

U.S. PATENT DOCUMENTS

| | | | |
|---|---|---|---|
| 2,407,152 | A | 9/1946 | Haase |
| 3,223,573 | A | 12/1965 | Deist |

(Continued)

FOREIGN PATENT DOCUMENTS

| | | |
|---|---|---|
| DE | 197 18 699 | 5/1998 |
| EP | 0 503 532 | 9/1992 |

(Continued)

OTHER PUBLICATIONS

A Decision on Grant Patent for Invention dated May 10, 2009 from the Russian Patent Office in corresponding Russian application No. 2007126803.

(Continued)

*Primary Examiner* — Geoffrey L Knable
(74) *Attorney, Agent, or Firm* — Finnegan, Henderson, Farabow, Garrett & Dunner, L.L.P.

(57) ABSTRACT

A method and a plant for manufacturing tires for vehicle wheels wherein the method includes the steps of: a) building in a building station a substantially cylindrical carcass structure; b) manufacturing in a finishing station a substantially cylindrical sleeve including a tread band applied at a radially outer position with respect to a belt structure including at least one belt layer. Step b) includes the steps of assembling a first belt structure at a first working position on a first auxiliary drum of the finishing station; applying a tread band at a second working position at a radially outer position with respect to a second belt structure previously assembled on a second auxiliary drum of the finishing station, positioning the first auxiliary drum supporting the first belt structure at the second working position; and positioning the second auxiliary drum supporting the substantially cylindrical sleeve thus obtained at a picking position of the finishing station.

26 Claims, 2 Drawing Sheets

(56) References Cited

U.S. PATENT DOCUMENTS

| | | | |
|---|---|---|---|
| 3,775,220 A | 11/1973 | Rattray | |
| 3,850,219 A | 11/1974 | Snyder | |
| 3,990,931 A | 11/1976 | Leblond et al. | |
| 4,140,168 A | 2/1979 | Caretta | |
| 4,427,473 A * | 1/1984 | Shichman et al. | 156/130 |
| 4,521,269 A * | 6/1985 | Ozawa | 156/420 |
| 4,531,561 A | 7/1985 | Ippen et al. | |
| 4,732,640 A | 3/1988 | Goodfellow | |
| 4,805,872 A | 2/1989 | Loeffler | |
| 4,848,429 A | 7/1989 | Mezzanotte | |
| 4,877,468 A | 10/1989 | Siegenthaler | |
| 4,985,100 A | 1/1991 | Sasaki et al. | |
| 5,007,974 A | 4/1991 | Maathuis et al. | |
| 5,948,207 A | 9/1999 | Huisman et al. | |
| 6,139,668 A | 10/2000 | Stokes et al. | |
| 6,446,423 B1 | 9/2002 | Noferi | |
| 2001/0002608 A1 | 6/2001 | Okada et al. | |
| 2001/0047840 A1 | 12/2001 | Nanni et al. | |
| 2002/0153083 A1 | 10/2002 | Takagi | |
| 2003/0102088 A1 | 6/2003 | Iiduka | |
| 2008/0196817 A1 | 8/2008 | Mancini | |
| 2008/0202667 A1 | 8/2008 | Mancini | |

FOREIGN PATENT DOCUMENTS

| | | |
|---|---|---|
| EP | 0 580 142 | 1/1994 |
| EP | 0 613 757 | 9/1994 |
| EP | 0 256 962 | 2/1998 |
| EP | 0 873 852 | 10/1998 |
| EP | 1 106 335 | 6/2001 |
| EP | 1 295 708 | 3/2003 |
| EP | 1 481 791 | 12/2004 |
| JP | 60-245542 | 12/1985 |
| JP | 02-099322 | 4/1990 |
| JP | 2000-94542 | 4/2000 |
| JP | 2000-351164 | 12/2000 |
| JP | 2001-162694 | 6/2001 |
| JP | 2002-046194 | 2/2002 |
| JP | 2003-236946 | 8/2003 |
| JP | 2008-524017 | 7/2008 |
| JP | 2008-524018 | 7/2008 |
| RU | 2 174 469 | 6/2000 |
| SU | 1657409 | 6/1991 |
| WO | WO 98/12043 | 3/1998 |
| WO | WO 02/094545 | 11/2002 |
| WO | WO 2004/041521 | 5/2004 |

OTHER PUBLICATIONS

Communication pursuant to Article 94(3) EPC dated May 23, 2008 from the European Patent Office in corresponding European Patent Application No. 04 806 864.7-2307.

Office Action issued on Jun. 10, 2010 by Japanese Patent Office in corresponding Application No. JP 2007-546309 (3 pages).

Decision of Rejection issued Aug. 10, 2011 by the Japan Patent Office in corresponding Japan Patent Applicatioon No. JP 2007-546310 (2 pages).

English-language translation of Decision of Rejection issued Aug. 10, 2011 by the Japan Patent Office in corresponding Japan Patent Applicatioon No. JP 2007-546310 (3 pages).

Notice of Opposition to a European Patent issued on Nov. 17, 2010, in corresponding European Patent No. 1827807.

Notice of Preliminary Rejection with English language translation issued by Korean Intellectual Property Office on Jul. 23, 2010 in corresponding Korean Application No. 10-2007-7015980.

Notice of Reasons for Rejection mailed Dec. 21, 2010, in corresponding Japan Patent Application No. JP 2007-546311.

Notice of Reasons for Rejection mailed Jun. 10, 2010, in corresponding Japan Patent Application No. JP 2007-546310.

Notice of Reasons for Rejection with English language translation issued by Japan Patent Office on Jun. 10, 2010 in corresponding Japanese Application No. 2007-546311.

* cited by examiner

METHOD AND PLANT FOR MANUFACTURING TYRES FOR VEHICLE WHEELS

CROSS REFERENCE TO RELATED APPLICATIONS

This is a division of U.S. application Ser. No. 11/791,863, filed Dec. 5, 2007 now U.S. Pat. No. 8,226,785, which claims priority to International Application No. PCT/IT/2004/000699, filed Dec. 16, 2004, both of which are incorporated herein by reference.

BACKGROUND OF THE INVENTION

The present invention relates to a method for manufacturing tyres for vehicle wheels.

The invention also pertains to a plant for manufacturing vehicle tyres, which may be employed to carry out the above mentioned manufacturing method, as well as to a plant for making tyres for vehicle wheels.

PRIOR ART

A tyre for vehicle wheels generally comprises a carcass structure including at least one carcass ply having respectively opposite end flaps turned up loop-wise around annular anchoring structures, each of said anchoring structures being usually made up of a substantially circumferential annular insert onto which at least one filling insert is applied, at a radially external position thereof.

A belt structure comprising one or more belt layers, having textile or metallic reinforcing cords arranged at radial superposed relationship with each other and with the carcass structure, is associated to the latter. A tread band, made of elastomeric material like other semifinished products which constitute the tyre, is applied to the belt structure at a radially external position thereof.

Within the framework of the present description and in the following claims, the term "elastomeric material" is used to indicate a composition comprising at least one elastomeric polymer and at least one reinforcing filler. Preferably, such composition further comprises additives such as, for example, a cross-linking agent and/or plasticizer. Thanks to the presence of the cross-linking agent, such material can be cross-linked by heating, so as to form the end product.

In addition respective sidewalls of elastomeric material are also applied to the side surfaces of the carcass structure, each of them extending from one of the side edges of the tread band up to the respective annular anchoring structure at the beads, which sidewalls, depending on the different embodiments, can exhibit respective radially outer end edges either superposed on the side edges of the tread band so as to form a design scheme of the type usually referred to as "overlying sidewalls", or interposed between the carcass structure and the side edges of the tread band itself, in accordance with a design scheme of the type referred to as "underlying-sidewalls."

In most of the conventional processes for tyre manufacture, it is provided that the carcass structure and the belt structure together with the respective tread band are made separately of each other in respective work stations, so as to be mutually assembled at a later time.

More particularly, the building of the carcass structure is carried out in a building station, and it first contemplates the deposition of the carcass ply or plies on a first drum usually identified as "building drum" to form a substantially cylindrical sleeve. The annular anchoring structures at the beads are fitted or formed on the opposite end flaps of the carcass ply or plies which in turn are turned up around the annular structures themselves so as to enclose them in a sort of loop.

Simultaneously, in a finishing station provided with a second drum generally indicated with the term of: auxiliary drum, an outer sleeve is manufactured, which is substantially cylindrical as well, which comprises the belt layers laid down in radially superposed relationship with each other, and the tread band applied to the belt layers at a radially outer position thereof.

The outer sleeve is then picked up from the auxiliary drum to be coupled with the carcass sleeve. To this end, the outer sleeve is arranged in coaxial relation around the carcass sleeve, and then the carcass ply or plies are shaped into a toroidal conformation by axially moving the beads close to each other and simultaneously admitting fluid under pressure into the carcass sleeve, so as to determine the application of the belt/tread band sleeve to the carcass structure of the tyre at a radially outer position thereof.

Assembling of the carcass sleeve with the outer sleeve can be carried out on the same drum used for building the carcass sleeve, in which case reference is made to a "unistage manufacturing process." A manufacturing process of this type is described in document U.S. Pat. No. 3,990,931, for example.

Alternatively, assembling may be carried out on a so-called "shaping drum" onto which the carcass sleeve and outer sleeve are transferred, to manufacture the tyre according to a so-called "two-stage manufacturing process," as described in document EP 0 613 757, for example.

In conventional manufacturing methods the tread band is usually made of a continuously-extruded section member that, after being cooled for stabilisation of its geometrical conformation, is stored on suitable benches or reels. The semifinished product in the form of sections or of a continuous strip is then sent to a delivering unit which either picks up the sections or cuts the continuous strip into sections of predetermined length, each section constituting the tread band to be circumferentially applied onto the belt structure of a tyre being manufactured.

In recent times and in order to further improve the mechanical characteristics and the quality of the tyre, it has been proposed to realise the tread band in an alternative way, i.e. by winding a continuous elongated element according to coils arranged side by side directly on the belt structure rather than by winding and cutting to size sections of a continuous strip extruded in advance and stored on benches or in reels.

From the practical point of view, this can be obtained—as described for example in International patent application WO 2004/041521 in the name of the same Applicant—by an assembling process comprising the steps of:

i) arranging a belt structure comprising at least one belt layer on an auxiliary drum;

ii) applying a tread band on the belt structure by winding thereon at least one continuous elongated element of elastomeric material according to contiguous circumferential coils;

iii) picking up a cylindrical sleeve including the belt structure and the tread band from the auxiliary drum to transfer the sleeve to a position coaxially centred with respect to the carcass sleeve.

Such continuous elongated element is obtained in situ and forms a plurality of coils the orientation and mutual-overlapping parameters of which are suitably managed so as to control the variations in thickness to be given to the tread band during the manufacture, based on a predetermined deposition scheme preset on an electronic computer, with a considerable increase of the quality characteristics of the tread band, which in turn positively influence the tyre performance and life.

From the production point of view, however, this improvement of the mechanical and quality characteristics of the tyre implies a difficult problem to be solved, namely that of reconciling the productivity (meaning the number of pieces that can be manufactured in a unit of time) of the building station of the carcass structure—which is normally high—with the productivity of the finishing station where the substantially cylindrical sleeve comprising the belt structure and the tread band is manufactured.

The productivity of the finishing station, in fact, is heavily affected by the inherent slowness of the coil winding step of the continuous elongated element of green elastomeric material.

The discrepancy between the productivity of the building station of the carcass structure and that of the finishing station wherein the belt structure/tread band sleeve is manufactured, is considerable and particularly critical to manage if the tread band comprises at least two portions; such as for example a base portion and a radially outer portion intended to engage the ground. More precisely, when the carcass structure built in the building station remains stationary so as not to lose its centring conditions while it awaits to receive the aforementioned sleeve, said wait can continue even for time periods in the order of minutes, due to the manufacture of said portions, a condition which prevents the building of a subsequent carcass structure, thus extending the overall cycle times needed to manufacture a green tyre.

PROBLEM UNDERLYING THE INVENTION

The Applicant intends to solve the problem of manufacturing a high quality tyre reconciling the different productivity rates of the building station of the carcass structure and of the finishing station intended to manufacture the substantially cylindrical belt structure/tread band sleeve also in the event that such sleeve includes a tread band made by winding coils of at least one continuous elongated element.

SUMMARY OF THE INVENTION

According to the present invention, the Applicant has found that great improvements are achieved in terms of overall productivity and quality of the product within the framework of a tyre manufacturing process which provides for the assembly of semifinished products, by adopting the following measures:
   supporting the various semifinished products being realised in the finishing station on at least two auxiliary drums,
   carrying out in the finishing station intended to manufacture the sleeve including the belt structure and the tread band a specific sequence of cyclically repeated production steps and drum positioning steps;
   realising the carcass structure and the tread band (the latter by winding coils of at least one continuous elongated element of green elastomeric material) at two working positions defined in different zones of the finishing station, by operating steps carried out at least in part simultaneously with each other.

More particularly, the present invention relates, according to a first aspect thereof, to a method for manufacturing tyres for vehicle wheels comprising the steps of:
   a) building in a building station a substantially cylindrical carcass structure comprising at least one carcass ply operatively associated to annular anchoring structures axially spaced apart from each other;
   b) manufacturing in a finishing station a substantially cylindrical sleeve comprising a tread band applied at a radially outer position with respect to a belt structure comprising at least one belt layer, said step b) comprising the steps of:
      b1) assembling a first belt structure at a first working position on a first auxiliary drum of the finishing station;
      b2) applying a tread band at a second working position at a radially outer position with respect to a second belt structure previously assembled on a second auxiliary drum of the finishing station, said application step being carried out by laying down according to respective predetermined paths a first and a second continuous elongated element of green elastomeric material at a radially outer position with respect to said second belt structure;
      b3) positioning the first auxiliary drum supporting the first belt structure at said second working position;
      b4) positioning said second auxiliary drum supporting the substantially cylindrical sleeve thus obtained at a picking position of the finishing station;
   c) transferring said substantially cylindrical sleeve from said picking position of the finishing station at a radially outer position with respect to a carcass structure built in the meantime in the building station;
   wherein said steps from b1) to b4) are repeated cyclically;
   wherein steps b1) and b2) are carried out at least in part simultaneously with one another; and
   wherein steps b3) and b4) are carried out at least in part simultaneously with one another.

In preferred features of the manufacturing method, steps b) and c) may be carried out in a time interval substantially equal to or smaller than, the time for carrying out said step a) of building the carcass structure (3); step b1) may further comprise the steps of:
   i) applying at a radially outer position with respect to the first auxiliary drum (19) a first belt layer (11a) including first reinforcing cords inclined with respect to the circumferential development direction of the sleeve; and
   ii) applying at a radially outer position with respect to the first belt layer (11a) a second belt layer (11b) comprising second reinforcing cords inclined along a crossed direction with respect to said first reinforcing cords; and
   step b1) may further comprise the step of:
   iii) applying at a radially outer position with respect to the first auxiliary drum (19) a strip-like element (23) of green elastomeric material including at least one reinforcing cord to form axially contiguous circumferential coils, so as to obtain a belt layer (12) including reinforcing cords substantially parallel to the circumferential development direction of the sleeve.

Strip-like element (23) of green elastomeric material may be applied at a radially outer position with respect to the second belt layer (11b).

In other embodiments of the method of the present invention, said step b1) may further comprise the step of:
   iv) applying a further layer (13) of green elastomeric material at a radially outer position with respect to said at least one belt layer (11a, 11b, 12), said layer (13) comprising a plurality of reinforcing cords;
   step b2) may be carried out at said second working position (B) by laying down said first continuous elongated element (27) of green elastomeric material at a radially outer position with respect to said second belt structure (4) along substantially the entire transversal development thereof so as to form a radially inner layer of tread band (5);
   step b2) may be carried out at said second working position (B) by laying down said second continuous elongated element (28) at a radially outer position with respect to said radially inner layer of the tread band (5) along substantially the entire transversal development thereof so as to form a radially outer layer of tread band (5);

step b2) may be carried out at said second working position (B) by laying down said first continuous elongated element (27) at a radially outer position with respect to at least one portion of said second belt structure (4) so as to form a corresponding portion of the tread band (5); and step b2) may be carried out at said second working position (B) by laying down said second continuous elongated element (28) at an axially aligned position with respect to said at least one portion of the tread band (5) formed by said first continuous elongated element (27), so as to form a further portion of the tread band (5).

In still other embodiments, in the method of the present invention, step b) may further comprise the step of b5) applying according to a respective predetermined path a third continuous elongated element of green elastomeric material at said picking position (C) at a radially outer position with respect to said second belt structure (4).

In certain instances in accordance with the present invention, said first (27) and said second (28) continuous elongated elements may be laid down at opposite sides of the second auxiliary drum (20).

In other features of the method of the present invention, step b2) may be carried out by delivering said first (27) and said second (28) continuous elongated elements from respective delivery members (25, 26) arranged at said second working position (B) near said second auxiliary drum (20), simultaneously with winding of the continuous elongated elements (27, 28) and said drum (20);

step b5) may be carried out by delivering said third continuous elongated element from a respective delivery member arranged at said picking position (C) near one of said auxiliary drums (19, 20), simultaneously with winding of the continuous elongated element on one of said auxiliary drums (19, 20);

wherein the delivery of said continuous elongated elements (27, 28) may be carried out by extrusion through said delivery members (25, 26);

wherein said steps b2) or b5) may be effected by carrying out, simultaneously with the application of said continuous elongated elements (27, 28), the steps of:

d) imparting to at least one of said auxiliary drums (19, 20) carrying the first or the second belt structure (4), a rotary motion about a geometric axis thereof, so as to circumferentially distribute said continuous elongated elements (27, 28) at a radially outer position with respect to said first or said second belt structure (4); and e) carrying out controlled relative displacements between said at least one auxiliary drum (19, 20) and the delivery members (25, 26) to form with said continuous elongated elements (27, 28) a plurality of coils arranged in mutual side by side relationship to define the tread band (5), wherein said displacements may be carried out by moving said at least one auxiliary drum (19, 20) with respect to said delivery members (25, 26), and wherein said steps d) and e) may be carried out by a displacing apparatus (18) active on said at least one auxiliary drum (19, 20).

In still other features of the method of the present invention, said working positions of the finishing station (17) may be angularly offset with one another;

said auxiliary drums (19, 20) may be supported by a substantially turret-like displacing apparatus (18) at positions angularly offset with one another, said steps b3) and b4) being carried out by rotating said displacing apparatus (18) about a substantially vertical rotation axis (Y-Y), wherein at least one of said auxiliary drums (19, 20) may be slidably supported by said displacing apparatus (18) and wherein the method may comprise the further step of translating said at least one auxiliary drum (19, 20) toward the rotation axis (Y-Y) of the displacing apparatus (18) before carrying out said rotation step of said apparatus (18).

In the method according to the present invention, the picking position (C) of the cylindrical sleeve may substantially coincide with said first working position (A); and the method may further comprise after said step c), the step of shaping said carcass structure (3) and said substantially cylindrical sleeve transferred at a radially outer position with respect to the same according to a substantially toroidal shape, so as to associate said sleeve with said carcass structure (3).

In the method of the present invention, the delivery of at least one of said continuous elongated elements (27, 28) may be carried out by delivering at least one semifinished product of green elastomeric material in the form of a continuous strip by means of at least one of said delivery members (25, 26).

In accordance with a further aspect of the invention, the above mentioned method can be carried out by means of a plant for manufacturing tyres for vehicle wheels comprising:

a) a building station for building a substantially cylindrical carcass structure comprising at least one carcass ply operatively associated to annular anchoring structures axially spaced apart from each other;

b) a finishing station for manufacturing a substantially cylindrical sleeve comprising a tread band applied at a radially outer position with respect to a belt structure comprising at least one belt layer, said finishing station comprising:

b1) a first auxiliary drum;

b2) a second auxiliary drum;

b3) a displacing apparatus adapted to support said auxiliary drums and to position said auxiliary drums at a first working position wherein said belt structure is assembled, at a second working position wherein said tread band is applied and at a picking position of said substantially cylindrical sleeve; said first and said second working positions being defined in different zones of the finishing station;

b4) at least two delivery members of respective continuous elongated elements of green elastomeric material arranged at said second working position for operatively interacting with one of said auxiliary drums;

c) at least one transfer device of the substantially cylindrical sleeve manufactured in the finishing station, adapted to operatively interact with one of said auxiliary drums at said picking position for transferring said substantially cylindrical sleeve at a radially outer position with respect to a carcass structure built in the building station.

Preferred features of the manufacturing plant may include at least one delivery device (24) of belt layers arranged at said first working position (A) for operatively interacting with one of said auxiliary drums (19, 20);

may further comprise at least one delivery device (22) of a strip-like element (23) of green elastomeric material including at least one reinforcing cord, arranged at said first working position (A) for operatively interacting with one of said auxiliary drums (19, 20) to form a belt layer (12) including reinforcing cords substantially parallel to the circumferential development direction of the sleeve;

may comprise at least one further delivery device of a belt layer (13) comprising a plurality of reinforcing cords, arranged at said first working position (A) for operatively interacting with one of said auxiliary drums (19, 20); and may further comprise at least one third delivery member of a respective third continuous elongated element of green elastomeric material arranged at said picking position (C) for operatively interacting with one of said auxiliary drums (19, 20).

In the plant according to the present invention, the delivery members (25, 26) of said continuous elongated elements (27, 28) may comprise at least one extruder (29, 30). At least one of said delivery members (25, 26) of the continuous elongated elements (27, 28) may deliver said continuous elongated element as a semifinished product of green elastomeric material in the form of a continuous strip. The displacing apparatus (18) may comprise at least one drum rotation unit (31, 32) adapted to rotate the auxiliary drums (19, 20) about a geometrical axis thereof; said auxiliary drums (19, 20) may be slidably supported by said displacing apparatus (18); said displacing apparatus (18) may comprise at least one drum translating unit (33, 34) adapted to carry out controlled axial movements of said auxiliary drums (19, 20) at said working positions (A, B) or at said picking position (C); and said displacing apparatus (18) may be of the substantially turret-like type and may be adapted to support said auxiliary drums (19, 20) at positions angularly offset with one another.

In still other preferred embodiments, the plant (1) according to the invention may further comprise at least one driving unit (35) adapted to rotate said displacing apparatus (18) about a substantially vertical rotation axis (Y-Y). The drum translating unit (33, 34) of the displacing apparatus (18) may translate said auxiliary drums (19, 20) between said working positions (A, B) or said picking position (C) and a stand-by position defined between said working positions (A, B, C) or picking position (C) and a rotation axis (Y-Y) of the displacing apparatus (18).

In other preferred features of the plant of the present invention, said delivery members (25, 26) of the continuous elongated elements (27, 28) may be arranged at said second working position (B) for operatively interacting at opposite sides of one of said auxiliary drums (19, 20); and the picking position (C) of the cylindrical sleeve substantially may coincide with said first working position (A). In another preferred aspect of the plant further comprises at least one apparatus for shaping said carcass structure (3) according to a substantially toroidal shape so as to associate the substantially cylindrical sleeve comprising the belt structure (4) and the tread band (5) with said carcass structure (3).

According to a further aspect thereof, the invention relates to a plant for making tyres for vehicle wheels, comprising a manufacturing plant as defined above and at least one vulcanisation station for vulcanising the tyres manufactured in said manufacturing plant.

Additional features and advantages of the invention will become more clearly apparent from the detailed description of a preferred, but not exclusive, embodiment of a method and of a plant for manufacturing tyres for vehicle wheels, in accordance with the present invention.

BRIEF DESCRIPTION OF THE DRAWINGS

Such a description will be set out hereinafter with reference to the accompanying drawings, given by way of indication and not of limitation, wherein.

DETAILED DESCRIPTION OF THE PREFERRED EMBODIMENTS

Figure 1:
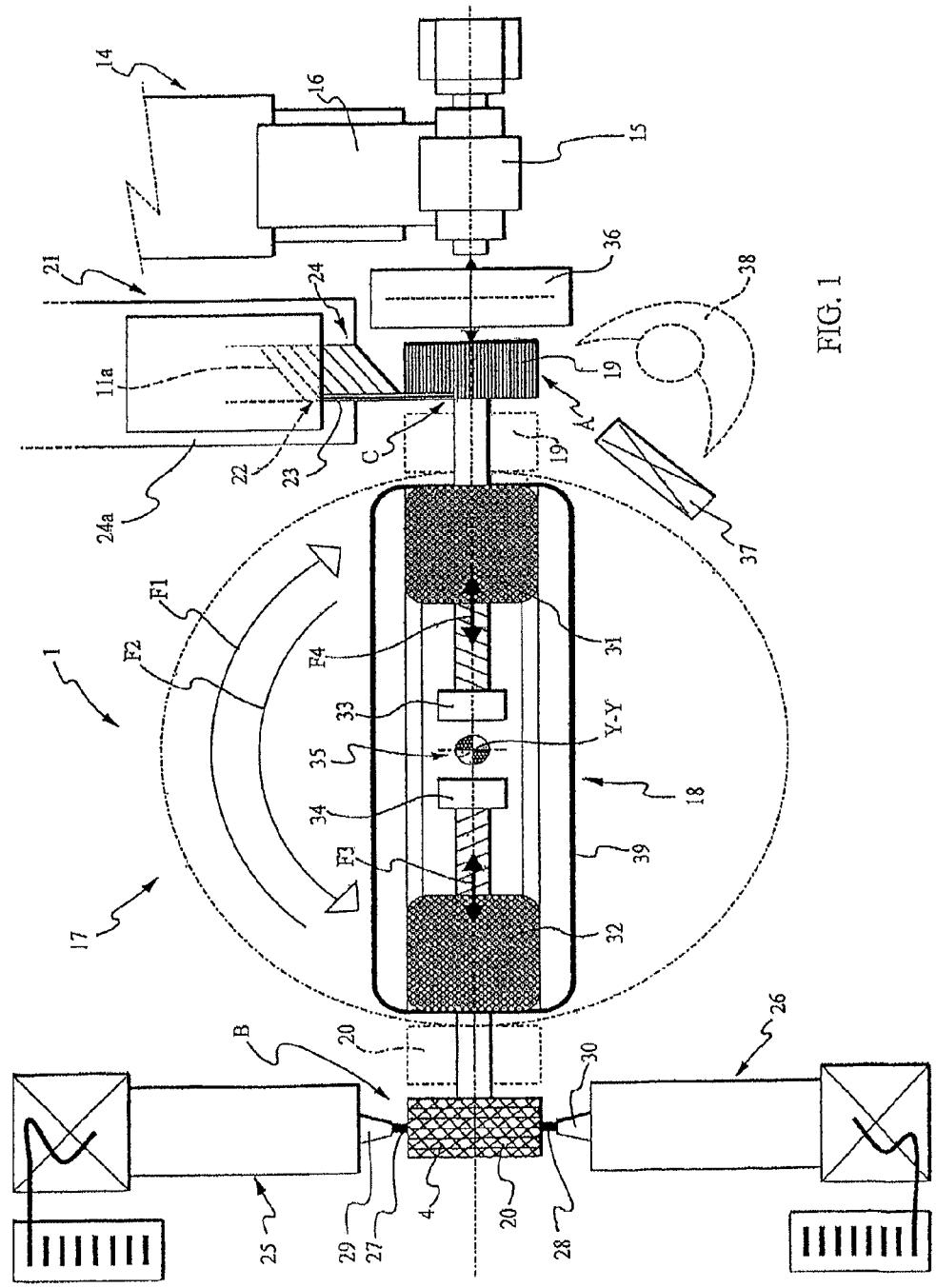
FIG. 1 is a schematic top view of a first preferred embodiment of a plant for manufacturing tyres in accordance with the present invention.

With reference to FIG. 1, a plant for manufacturing tyres for vehicle wheels, adapted to carry out a manufacturing method according to a preferred embodiment of the present invention, is generally indicated at 1.

Figure 2:
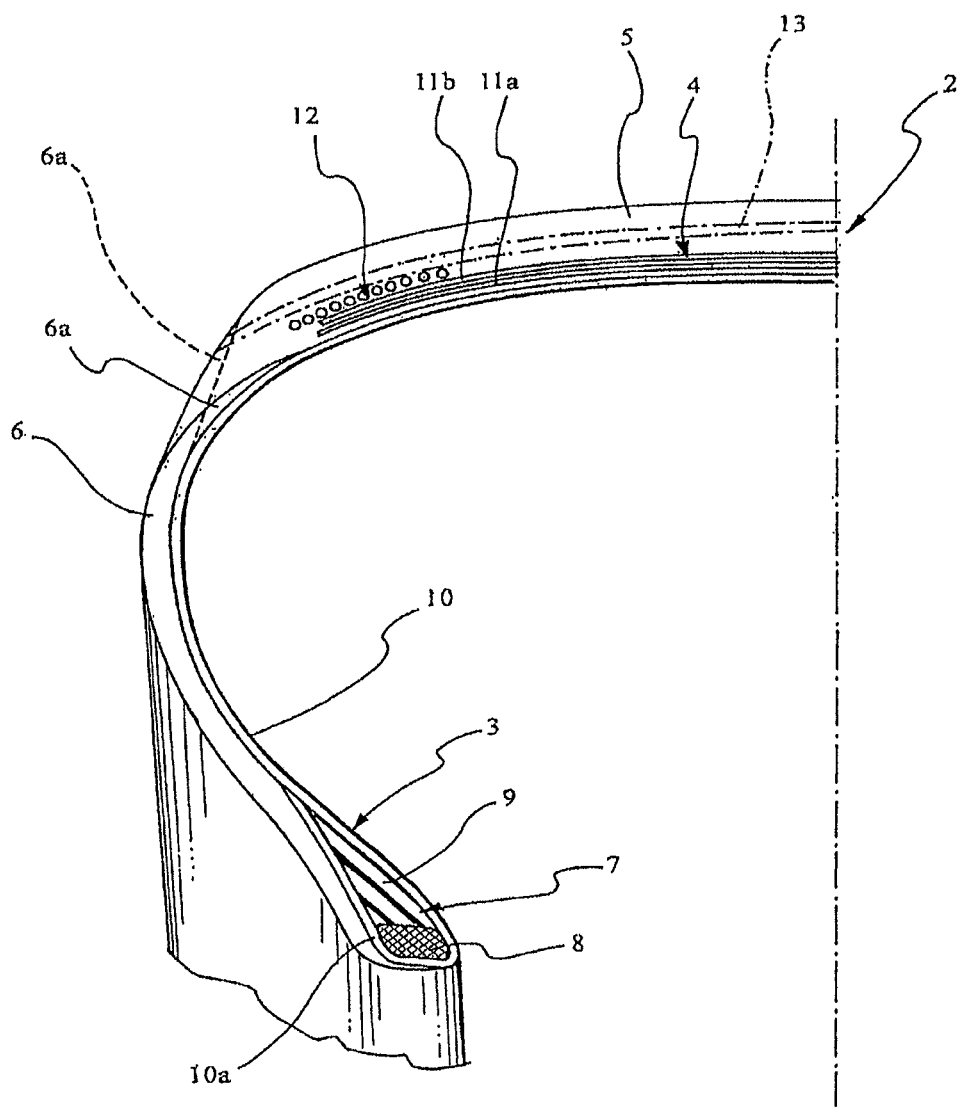
FIG. 2 is a schematic fragmentary cross-section view of a tyre obtainable in accordance with the method and the plant of the present invention.

A tyre that can be manufactured by the plant 1 is generally indicated at 2 in FIG. 2 and can be a tyre intended to equip the wheels of a car or the wheels of a heavy vehicle.

The tyres 2 essentially comprise a carcass structure 3 having a substantially toroidal conformation, a belt structure 4 having a substantially cylindrical conformation, circumferentially extending around the carcass structure 3, a tread band 5 applied to the belt structure 4 at a radially outer position thereof, and a pair of sidewalls 6 laterally applied, on opposite sides, to the carcass structure 3 and each extending from a side edge of the tread band 5 up to a radially inner edge of the carcass structure 3.

Each sidewall 6 essentially comprises a layer of elastomeric material having a suitable thickness and may have a radially outer end tailpiece 6a at least in part covered by the axial end of the tread band 5, as shown in solid line in FIG. 2, according to a construction scheme of the type usually identified as "underlying sidewalls."

Alternatively, the radially outer end tailpieces 6a of the sidewalls 6 can be laterally superposed on the corresponding axial ends of the tread band 5, as shown in dashed line in FIG. 2, to realise a construction scheme of the type usually identified as "overlying sidewalls."

The carcass structure 3 comprises a pair of annular anchoring structures 7 integrated in regions usually identified as "beads", each of them being for example made up of a substantially circumferential annular insert 8, usually called "bead core," and carrying an elastomeric filler 9 at a radially outer position thereof. Turned up around each of the annular anchoring structures 7 are the end flaps 10a of one or more carcass plies 10 comprising textile or metallic cords extending transversely with respect to the circumferential development of the tyre 2, possibly according to a predetermined inclination between the two annular anchoring structures 7.

The belt structure 4 comprises in turn at least one belt layer, preferably at least two belt layers 11a, 11b comprising reinforcing cords made of a suitable material, for example metallic or textile cords.

Preferably; said reinforcing cords are suitably inclined with respect to the circumferential development of the tyre 2, according to respectively crossed orientations between one belt layer and the other.

In a preferred embodiment, the belt structure 4 further comprises at least one belt layer 12 at a radially outer position with respect to the belt layers 11a, 11b and including at least one reinforcing cord, preferably a plurality of cords circumferentially wound according to coils axially arranged side by side and usually called "zero-degree cords" in the art.

In a preferred embodiment, the belt structure 4 can comprise a belt layer 12 including zero-degree cords substantially extending for the entire transversal development of the belt structure 4; alternatively, the belt structure 4 can comprise a pair of belt layers 12, each including zero-degree cords, arranged near opposite shoulder zones of the tyre 2 and axially extending along a portion of limited width, as schematically shown in FIG. 2.

In heavy-duty tyres, such as tyres for trucks and heavy transport vehicles, the belt structure 4 may also incorporate, at a radially outer position with respect to the belt layers 11a, 11b, a further layer 13 made of elastomeric material preferably including a plurality of reinforcing cords, usually referred to as "breaker layer" and intended to prevent foreign bodies from entering the underlying belt layers.

The tread band 5 may essentially consist of a single elastomeric material or, alternatively, it may comprise portions consisting of respective elastomeric materials having appropriate composition and appropriate mechanical and chemical-physical characteristics.

These portions may be constituted by one or more radially superposed layers having suitable thickness, by suitably shaped sectors arranged according to a predetermined configuration along the axial development of the tread band or by a combination of both.

Thus, for example, the tread band 5 may include a radially inner layer or base layer, essentially consisting of a first elastomeric material having appropriate composition and mechanical and chemical-physical characteristics, for example adapted to reduce the rolling resistance of the tyre, and a radially outer layer essentially consisting of a second elastomeric material having composition and mechanical and chemical-physical characteristics differing from the first elastomeric material, for example adapted to optimise the grip performance on wet surfaces and the wear resistance of the tyre.

The individual components of the carcass structure 3 and of the belt structure 4, such as in particular the annular anchoring structures 7, the carcass plies 10, the belt layers 11a, 11b and the elements of elastomeric material (strip-like elements) including at least one reinforcing cord and intended to form the belt layer 12 and optionally the breaker layer 13, are supplied to the plant 1 in the form of semifinished products made during preceding manufacturing steps, to be suitably assembled with each other according to the step described hereinafter.

With reference to FIG. 1, a first preferred embodiment of a plant 1 for manufacturing tyres for vehicle wheels according to the invention, for example for manufacturing a tyre 2 of the type illustrated above, shall now be described.

In the following description, reference will be made to the various components of the tyre 2 in their state as semifinished products and, as regards the various elastomeric materials used, in their green state, that is, prior to the vulcanisation operations which link the various semifinished products together to give the final tyre 2.

The plant 1 comprises a building station 14 intended to build a substantially cylindrical carcass structure 3 comprising one or more carcass plies 10 operatively associated to the annular anchoring structures 7 axially spaced apart from each other.

The building station 14 comprises a primary drum 15, not described in detail as it can be made in any convenient manner, on which the carcass ply or plies 10 are preferably wound; said plies come from a feeding line 16 along which they are cut into sections of appropriate length related to the circumferential extension of the primary drum 15, before being applied thereon to form a so-called substantially cylindrical "carcass sleeve."

The building station 14 also comprises a line (not shown) for feeding the sidewalls 6, which line supplies a semifinished product in the form of a continuous strip of elastomeric material from which sections of predetermined length are cut out, said length being related to the circumferential extension of the primary drum 15 and of the tyre 2 to be manufactured.

Alternatively, the building station 14 can be provided with a further building drum (not shown) on which the assembly of the carcass structure 3 components and possibly also of the sidewalls 6 takes place, and with a transfer device (also not shown) for transferring the assembled carcass sleeve onto the primary drum 15.

The plant 1 further comprises a finishing station 17 intended to manufacture a substantially cylindrical sleeve comprising:

i) the tread band 5 including one or more green elastomeric materials, the tread band being applied at a radially outer position with respect to ii) the belt structure 4, comprising the layers 11a, 11b including reinforcing cords suitably inclined with respect to the circumferential development of the sleeve according to respectively crossed orientations between one belt layer and the other, optionally the layer 12 including reinforcing cords substantially parallel to the circumferential development direction of the substantially cylindrical sleeve, which layer 12, in this preferred variant, is applied at a radially outer position with respect to the layers 11a, 11b, and optionally the breaker layer 13 which, in this preferred variant, is applied at a radially outer position with respect to the layer 12.

The finishing station 17 comprises in turn a displacing apparatus 18 adapted to support a first auxiliary drum 19 and a second auxiliary drum 20 and to position said auxiliary drums 19, 20 at a plurality of working positions at which the operating steps required for manufacturing the above substantially cylindrical sleeve are carried out.

More particularly, the displacing apparatus 18 is adapted to position the auxiliary drums 19, 20 at a first working position, indicated with letter A in FIG. 1, wherein the belt structure 4 is assembled, at least one second working position, indicated with letter B in FIG. 1, wherein the tread band 5 is applied, and a picking position C of the substantially cylindrical sleeve manufactured in the finishing station 17.

In this preferred embodiment, the picking position C of the substantially cylindrical sleeve substantially coincides with the first working position A.

The first working position A and the second working position B. are defined in different zones of the finishing station 17 and, preferably, they are defined at opposite sides of the displacing apparatus 18.

In the preferred embodiment illustrated in FIG. 1, moreover, it is provided that in the picking position C the auxiliary drum 19, 20 positioned therein by the displacing apparatus 18 is arranged according to a relationship of coaxial alignment with the primary drum 15 of the building station 14.

The finishing station 17 comprises an apparatus for applying the belt structure 4 on the same auxiliary drum, generally indicated at 21, adapted to operatively interact with the auxiliary drum 19, 20 arranged at the first working position A by the displacing apparatus 18.

The applying apparatus 21 comprises in turn at least one delivery device 24 of the belt layers 11a, 11b arranged at the first working position A for operatively interacting with the auxiliary drum 19, 20 arranged at said working position by the displacing apparatus 18.

By way of example, the delivery device 24 may comprise, in a way known per se, at least one feeding line 24a, along which the semifinished products in the form of a continuous strip are caused to move forward; said strip being then cut into sections of a length corresponding to the circumferential development of the auxiliary drums 19, 20 simultaneously with the formation of the respective belt layers 11a, 11b on the same drums.

In a preferred embodiment, the applying apparatus 21 of the finishing station 17 further comprises at least one delivery device 22 of a strip-like element 23 of green elastomeric material including at least one reinforcing cord, preferably a plurality of textile or metallic reinforcing cords, strip-like element 23 that is applied at a radially outer position with respect to the belt layers 11a, 11b to form axially contiguous circumferential coils intended to form the belt layer 12.

To this end, the delivery device 22 is arranged at the first working position A for operatively interacting with the auxiliary drum 19, 20 arranged at said working position by the displacing apparatus 18.

In a preferred embodiment, the apparatus 21 further comprises at least one delivery device of a further belt layer preferably including a plurality of reinforcing cords, arranged at the first working position A for operatively interacting with the auxiliary drum 19, 20 arranged at said working position by the displacing apparatus 18 for forming the aforementioned breaker layer 13.

The finishing station 17 further comprises at least two delivery members 25, 26, of respective continuous elongated elements 27, 28 of green elastomeric material, which delivery members are arranged at ,interacting with the auxiliary drum displacing apparatus 18.

In the preferred embodiment shown in FIG. 1, the delivery members 25, 26 of the continuous elongated elements 27, 28 are arranged at the second working position B for operatively interacting at opposite sides of the auxiliary drum 19, 20 arranged at said working position by the displacing apparatus 18.

The delivery members 25, 26 are adapted to lay down the continuous elongated elements 27, 28 according to contiguous circumferential coils on a belt structure 4 previously assembled on the auxiliary drum 19 or 20 arranged at the second working position B.

More particularly, the delivery members 25, 26 can for example comprise an extruder or, alternatively, an applicator roller or other member adapted to deliver the continuous elongated elements 27, 28 at a radially outer position with respect to the belt structure 4 supported by the auxiliary drum 19 or 20 at the second working position B, simultaneously with winding of the elongated elements themselves at a radially outer position with respect to the belt structure 4 as will be better described hereinafter.

Preferably, each of the delivery members 25, 26 comprises at least one extruder indicated in FIG. 1 with reference numerals 29, 30.

In order to wind the continuous elongated elements delivered by the extruders 29, 30 at a radially outer position with respect to the belt structure 4, the displacing apparatus 18 of the preferred embodiment shown in FIG. 1 comprises at least one drum rotation unit, preferably a pair of rotation units 31, 32, adapted to rotate the auxiliary drums 19, 20 about their geometrical axis.

In this way, it is advantageously possible to carry out, in an effective manner, a controlled deposition of the continuous elongated elements 27, 28 at a radially outer position with respect to the belt structure 4.

Preferably, and according to what is illustrated in FIG. 1, the displacing apparatus 18 is of the substantially turret-like type and is adapted to support the auxiliary drums 19, 20 at positions angularly offset with each other, for example offset at an angle of about 180°.

Preferably, the displacing apparatus 18 is further provided with at least one driving unit 35 adapted to rotate the displacing apparatus 18 as a whole about a substantially vertical rotation axis Y-Y so as to position the auxiliary drums 19, 20 at the above first and second working positions A, B.

Preferably, the auxiliary drums 19, 20 and the respective driving units 31, 32 are slidably supported by the displacing apparatus 18 by a supporting carriage, not better shown in FIG. 1, which is in turn slidably mounted on a rotatable supporting platform 39 of the displacing apparatus 18.

Preferably, each auxiliary drum 19, 20 is in integral translating motion with the is corresponding rotation unit 31, 32 along the rotatable supporting platform 39.

In a preferred embodiment, the displacing apparatus 18 comprises at least one drum translating unit adapted to carry out controlled axial movements of the drums 19, 20 at the working positions A, B or at the picking position C of the substantially cylindrical sleeve including the belt structure 4 and the tread band 5 manufactured in the finishing station 17.

Preferably, said drum translating unit causes controlled axial movements not only of the auxiliary drums 19, 20 but also of the relevant rotation units 31, 32.

In the preferred embodiment shown in FIG. 1, the displacing apparatus 18 comprises a pair of drum translating units 33, 34, for example of the type comprising a worm screw adapted to engage with a corresponding nut thread associated to said carriage supporting the auxiliary drums 19, 20.

Clearly, the drum translating units can comprise actuating mechanisms differing from those indicated above by way of example and selectable by a man skilled in the art as a function of specific application requirements.

Preferably, the drum translating units 33, 34 of the displacing apparatus 18 move the drums 19, 20 between the working positions A, B or the picking position C and a stand-by position defined between said positions and the rotation axis Y-Y of the displacing apparatus 18.

Preferably, said stand-by positions of the auxiliary drums 19, 20 are defined within the outer perimeter of the rotatable supporting platform 39.

Preferably, the drum translating units 33, 34 move the drums 19, 20 along a radial direction passing through the rotation axis Y-Y of the displacing apparatus 18 as illustrated by the double arrows F3, F4 in FIG. 1.

The drum translating units 33, 34 thus allow to achieve the following advantageous technical effects:

i) that of properly moving the auxiliary drums 19, 20 with respect to the delivery members 25, 26;

ii) that of carrying out a controlled deposition of the continuous elongated elements 27, 28 at a radially outer position with respect to the belt structure 4 according to coils partially arranged side by side and/or partially superposed with each other according to what is required to manufacture a tread band 5 having a high quality level;

iii) that of carrying out a predetermined offset of the belt layers delivered by the applying apparatus 21, for example to compensate any design asymmetries of the tyre 2; and iv) that of decreasing the transversal dimensions and the inertia forces during the displacement of the auxiliary drums 19, 20 between the working positions A and B by moving the auxiliary drums 19, 20 close to the rotation axis Y-Y of the displacing apparatus 18.

Advantageously, moreover, the drum translating units 33, 34 allow to carry out a controlled deposition of the continuous elongated elements 27, 28 while maintaining stationary the delivery members 25, 26 with a simplification of the mechanical application system of the continuous elongated elements and, thereby, with a reduction of the costs for realising the plant 1.

The plant 1 further comprises at least one transfer device 36 of the substantially cylindrical sleeve manufactured in the finishing station 17, adapted to operatively interact with one of the auxiliary drums 19, 20 at the above-identified picking position C- in this case substantially coinciding with the first working position A- for transferring the substantially cylindrical sleeve manufactured in the finishing station 17 at a radially outer position with respect to the carcass structure 3 built in the building station 14.

The transfer device 36 preferably has a substantially annular conformation and is operated in a way known per se (not shown) so as to be arranged around the auxiliary drum 19, 20 positioned at the picking position C for picking up the substantially cylindrical sleeve including the belt structure 4 and the tread band 5 manufactured in the finishing station 17 and for transferring said sleeve coaxially to the carcass structure 3 built in the building station 14.

In an alternative preferred embodiment, not shown for simplicity, the plant 1 may further comprise a third delivery member of a respective continuous elongated element of green elastomeric material arranged at the picking position C (for example coinciding with the first working position A) of the substantially cylindrical sleeve manufactured in the finishing station 17 for operatively interacting With the auxiliary drum 19, 20 positioned therein by the displacing apparatus 18.

In this case, the plant 1 allows to apply the tread band 5 both in the working position B, and in the picking position C (for example coinciding with the first working position A) of the substantially cylindrical sleeve, wherever this is required to meet specific application requirements.

The plant 1 further comprises at least one apparatus (not shown being known per se) for shaping the carcass structure 3 according to a substantially toroidal shape so as to associate the substantially cylindrical sleeve comprising the belt structure 4 and the tread band 5 manufactured in the finishing station 17 to the carcass structure 3.

Preferably, this shaping apparatus is adapted to operatively interact with the primary drum 15 within the building station 14 so as to carry out, as it will be better understood hereinafter, a so-called unistage manufacturing process.

The plant 1 finally comprises a control unit 37 by means of which an operator 38 can program and manage the various operating steps that can be carried out by the same manufacturing plant.

With reference to the plant 1 described above, a first preferred embodiment of a method according to the invention for manufacturing tyres for vehicle wheels, for example the tyre 2 described above, will now be described.

In particular, the method will be illustrated with reference to steady-state working conditions, as illustrated in FIG. 1, wherein the auxiliary drum 19 is in the first working position A and does not support any semifinished products, whereas the auxiliary drum 20 is in the second working position B and supports a belt structure 4 assembled on said drum in a previous step of the method.

In a first step of the method, a substantially cylindrical carcass structure 3 comprising at least one carcass ply 10 operatively associated to the annular anchoring structures 7 axially spaced apart from each other, is built in the building station 14.

In this step, the carcass ply or plies 10 coming from the feeding line 16 along which they are cut into sections of appropriate length, related to the circumferential development of the primary drum 15, before being applied thereto, are wound on the primary drum 15 to form a so-called substantially cylindrical "carcass sleeve".

Afterwards, the annular anchoring structures 7 are fitted onto the end flaps 10a of ply/plies 10 to subsequently carry out the turning-up of the end flaps themselves to cause an engagement of the anchoring structures 7 into the loops thus formed by the turned-up ply/plies 10. The tyre sidewalls 6 may also be applied to the carcass sleeve, which sidewalls come from at least one respective sidewall-feeding line (not shown) supplying a semifinished product in the form of a continuous strip of elastomeric material, from which sections of predetermined length are cut out, said length being related to the circumferential development of the primary drum 15 and of the tyre 2 to be manufactured.

The method of the invention provides for the manufacture, in the finishing station 17, of a substantially cylindrical sleeve comprising the tread band 5 applied at a radially outer position with respect to the belt structure 4 including at least one belt layer, in this preferred embodiment the belt layers 11a, 11b, 12 and optionally 13.

The manufacture of this substantially cylindrical sleeve occurs at least in part simultaneously with the assembly of the components of the carcass structure 3 in the form of cylindrical sleeve (or carcass sleeve) on-the primary drum 15.

More particularly, the manufacture of the substantially cylindrical sleeve including the belt structure 4 and the tread band 5 carried out in the finishing station 17 comprises the operating steps illustrated hereinafter.

According to the invention, these steps are carried out at least in part simultaneously.

In a first step, a first belt structure 4 is assembled at the first working position A on the first auxiliary drum 19 of the finishing station 17.

In a preferred embodiment, the assembly step of the first belt structure 4 provides in the first place for carrying out the steps of applying at a radially outer position with respect to the first auxiliary drum 19 the first belt layer 11a comprising respective reinforcing cords inclined with respect to the circumferential development direction of the sleeve and of applying at a radially outer position with respect to the first belt layer 11a the second belt layer 11b comprising reinforcing cords inclined along a crossed direction with respect to said reinforcing cords belonging to the first belt layer 11a.

Advantageously, these steps are carried out by means of the delivery device 24 of the belt layers which operatively interacts with the auxiliary drum 19 positioned at the first working position A by the displacing apparatus 18 and by the rotation unit 31 which rotates the auxiliary drum 19 about its geometrical axis during the application of the various semifinished products.

More specifically, the feeding line 24a of the delivery device 24 delivers semifinished products in the form of a continuous strip, which are then cut into sections of a length corresponding to the circumferential development of the auxiliary drum 19 simultaneously with the formation of the respective belt layers 11a, 11b on the same drum, which is simultaneously rotated by the rotation unit 31.

In a preferred embodiment, the assembly step of the first belt structure 4 therefore provides for carrying out the step of applying at a radially outer position with respect to the first auxiliary drum 19 at least one strip-like element 23 of green elastomeric material including the reinforcing cord(s) to form axially contiguous circumferential coils, so as to obtain the belt layer 12 including reinforcing cords substantially parallel to the circumferential development direction of the substantially cylindrical sleeve being manufactured.

Preferably, said strip-like element 23 is applied at a radially outer position with respect to the second belt layer 11b substantially along the entire transversal development of the first belt structure 4 or, alternatively, only at opposed axial ends of the underlying belt layers 11a, 11b.

Advantageously, this step is carried out by the delivery device 22 of the application apparatus 21, which is also arranged at the first working position A for operatively interacting with the auxiliary drum 19 arranged therein by the displacing apparatus 18.

In a preferred embodiment, the assembly step of the first belt structure 4 finally provides for carrying out the step of applying the breaker layer 13 of green elastomeric material preferably including a plurality of reinforcing cords preferably inclined with respect to the circumferential development direction of the sleeve, at a radially outer position with respect to the underlying belt layers, in this case at a radially outer position with respect to the belt layer 12.

Advantageously, this step is carried out by a further delivery device of a belt layer preferably including a plurality of reinforcing cords (delivery device not shown for simplicity in FIG. 1), arranged at the first working position A for operatively interacting with the auxiliary drum 19 arranged therein by the displacing apparatus 18.

The manufacture of the substantially cylindrical sleeve including the belt structure and the tread band provides for forming a tread band 5 at a radially outer position with respect to a second belt structure 4 assembled on the second auxiliary drum 20 in a previous operating step of the method.

According to the invention, this forming step of the tread band 5 on the second auxiliary drum 20 arranged at the second working position B is carried out at least in part simultaneously with the step of assembling the first belt structure 4 on the first auxiliary drum 19 arranged at the first working position A.

More particularly, the method of the invention provides for applying a tread band 5 at the second working position B at a radially outer position with respect to a second belt structure 4 previously assembled on the second auxiliary drum 20 of the finishing station 17 at the first working position A.

Advantageously, the application step of the tread band 5 is carried out at the second working position B by laying down according to respective predetermined paths said at least two continuous elongate elements 27, 28 of green elastomeric material at a radially outer position with respect to the second belt structure 4 assembled on the second auxiliary drum 20.

Preferably, the continuous elongated elements 27, 28 are laid down at opposite sides of the second auxiliary drum 20 arranged at the second working position B by the displacing apparatus 18.

Preferably, the continuous elongated elements 27, 28 consist of respective elastomeric materials having different mechanical and/or chemical-physical characteristics so as to impart the desired performance to the tread band 5.

Advantageously, the application step of the tread band 5 is carried out by the delivery members 25, 26 arranged at the second working position B for operatively interacting with the auxiliary drum 20 arranged therein by the displacing apparatus 18.

In an alternative embodiment, at least one of the delivery members 25, 26 can deliver at least one of said continuous elongated elements 27, 28 in the form of a semifinished product made of elastomeric material in the form of a continuous strip, so as to form a portion of the tread band 5, such as a radially inner layer thereof. Preferably, this strip has a width substantially equal to the transversal development of the tread band 5 and is preferably cut into sections of a length corresponding to the circumferential development of the auxiliary drum 20 simultaneously with the formation of at least one portion of the tread band 5 on the same drum, which is simultaneously rotated by the rotation unit 32.

Preferably, however, the delivery of the continuous elongated elements 27, 28 is carried out by extrusion through the extruders 29, 30 of the delivery members 25, 26.

Preferably, the continuous elongated elements 27, 28 delivered by each extruder 29, 30 can advantageously possess a flattened section, so as to modulate the thickness of the elastomeric layer formed by them at a radially outer position with respect to the belt structure 4 by changing the overlapping amount of the contiguous coils and/or the orientation of the profile along a transversal direction of each elongated element 27, 28 coming from the corresponding extruder 29, 30 with respect to the underlying surface.

Preferably, the continuous elongated elements 27, 28 are laid down according to contiguous circumferential coils axially arranged side by side and/or radially superposed at a radially outer position with respect to the second belt structure 4 supported by the auxiliary drum 20 at the second working position B.

In this preferred embodiment, the application step of the tread band 5 is carried out by delivering the continuous elongated elements 27, 28 by means of the delivery members 25, 26 arranged at the second working position B near the second auxiliary drum 20, simultaneously with winding of the continuous elongated elements 27, 28 on said drum.

In particular, such winding is accomplished by carrying out, simultaneously with the application of the continuous elongated elements 27, 28, the steps of:

imparting to the second auxiliary drum 20 carrying the second belt structure 4 a rotary motion about a geometric axis thereof, so as to circumferentially distribute the continuous elongated elements 27, 28 at a radially outer position with respect to the second belt structure 4;

carrying out controlled relative displacements between the second auxiliary drum 20 and the delivery members 25, 26 to form with the continuous elongated elements 27, 28 a plurality of coils arranged in mutual side by side relationship to define at least one portion of the tread band 5.

In this preferred embodiment, the controlled relative displacements between the second auxiliary drum 20 and the delivery members 25, 26 are preferably carried out by moving the second auxiliary drum 20 with respect to said delivery members.

Preferably, the continuous elongated elements 27, 28 are delivered by the extruders 29, 30 simultaneously with a controlled rotation movement of the auxiliary drum 20 about its geometrical axis and a controlled translation movement of said drum with respect to the delivery members 25, 26, for example along a direction substantially parallel to said axis.

Advantageously, this rotation-translation movement of the auxiliary drum 20 is carried out by means of the displacing apparatus 18, in particular thanks to the action of the rotation unit 32 and of the translating unit 34 of such apparatus.

In this preferred embodiment of the method of the invention and thanks to the delivery of two continuous elongated elements 27, 28, it is advantageously possible to form, in a very flexible manner from the production point of view, a tread band 5 having structural features capable to achieve the desired performance of the tyre 2.

Thus, for example, it is advantageously possible to form— in a preferred embodiment—a tread band 5 including a pair of radially superposed layers, respectively inner and outer, according to a configuration known in the art with the term of "cap-and-base."

According to this preferred embodiment, the application step of the tread band 5 is carried out at the second working position B by laying down on of the aforementioned continuous elongated elements, for example the continuous elongated element 27, at a radially outer position with respect to the second belt structure 4 supported by the auxiliary drum 20 along substantially its entire transversal development so as to form a radially inner layer of the tread band 5.

Afterwards, the application step of the tread band 5 provides for laying down the second continuous elongated element 28 at a radially outer position with respect to the radially inner layer of tread band 5 thus formed.

Advantageously, the laying down of the second continuous elongated element 28 is carried out by substantially the entire transversal development of said radially inner layer so as to form a radially outer layer of the tread band 5.

In this preferred embodiment therefore, the laying down of the continuous elongated elements 27, 28 according to contiguous circumferential coils axially arranged side by side and/or radially superposed is carried out in two consecutive steps.

In a further preferred alternative embodiment, it is also advantageously possible to form a tread band 5 including two or more axially aligned sectors having specific mechanical characteristics according to a configuration which allows to achieve a plurality of advantageous technical effects, such as for example an improved resistance to the transversal stresses acting on the tread band 5 during use of the tyre 2, or the possibility of keeping the grip performance of the tyre 2 substantially constant as the tread band 5 wears out.

According to this preferred alternative embodiment, the application step of the tread band 5 is carried out at the second working position B by laying down one of said continuous elongated elements, for example the continuous elongated element 27, at a radially outer position with respect to at least one portion of the second belt structure 4 supported by the auxiliary drum 20 so as to form a corresponding portion of the tread band 5.

Afterwards, the application step of the tread band 5 provides for laying down the second continuous elongated element 28 at an axially aligned position with respect to the above portion formed by the continuous elongated element 27, so as to form a further portion of the tread band 5.

In this way it is possible to form a tread band 5 having at least two axially aligned portions or sectors having different mechanical and chemical-physical characteristics.

In this preferred alternative embodiment, the laying down of the continuous elongated elements 27, 28 can be carried out both m consecutive steps and at least in part simultaneously.

Once said steps of assembling the first belt structure 4 on the first auxiliary drum 19 and of applying the tread band 5 at a radially outer position with respect to the second belt structure 4 previously assembled on the second auxiliary drum 20 have been completed, the method of the invention provides for carrying out the steps of positioning the first auxiliary drum 19 supporting the first belt structure 4 at the second working position B and of positioning at the picking position C of the finishing station 17 the second auxiliary drum 20 supporting the substantially cylindrical sleeve including the tread band 5 applied at a radially outer position with respect to the second belt structure 4.

As described above, in a preferred embodiment of the invention, the picking position C of the substantially cylindrical sleeve thus manufactured substantially coincides with the first working position A.

According to the method of the invention, said steps of positioning the auxiliary drums 19 and 20 respectively at the second working position B and at the first working position A, are carried out at least in part simultaneously with each other.

In particular, such steps are preferably carried out by means of the displacing apparatus 18.

In a preferred embodiment and thanks to the fact that the displacing apparatus 18 is of the substantially turret-like type and supports the auxiliary drums 19, 20 at positions preferably angularly offset with each other, said positioning steps of the auxiliary drums 19 and 20 are carried out by rotating the displacing apparatus 18 about the substantially vertical rotation axis Y-Y. In particular, such rotary motion is carried out thanks to the driving unit 35.

In other words, in this preferred embodiment, the position of the auxiliary drums 19 and 20 is effectively exchanged practically simultaneously by simply rotating the displacing apparatus 18 about the rotation axis Y-Y, for example according to one of the two directions of rotation, clockwise and counter clockwise, indicated by the arrows F1 and respectively F2 in FIG. 1.

In a preferred embodiment and thanks to the fact that the auxiliary drums 19, 20 are slidably supported by the displacing apparatus. 18, the method of the invention comprises the further step of translating the auxiliary drums 19, 20 towards the rotation axis Y-Y of the displacing apparatus 18 before carrying out the rotation step of such apparatus.

Preferably, said step is carried out by the drum translating units 33 and 34 by translating both auxiliary drums 19, 20 and the relevant rotation units 31, 32, which are preferably 30 translationally integral with the same drums.

In this way, it is advantageously possible to decrease both the transversal dimensions and the inertia forces during the movements of the auxiliary drums 19, 20 between the working positions A and B with an increase of the safety features of the plant 1 and with a reduction of the driving force required to the driving unit 35 for rotating the displacing apparatus 18.

Preferably, the auxiliary drums 19, 20 and the relevant rotation units 31, 32 are translated towards the rotation axis Y-Y of the displacing apparatus 18 and are arranged at the above stand-by positions defined inside the outer perimeter of the rotatable supporting platform 39 of such apparatus.

Advantageously, the auxiliary drums 19, 20 of the displacing apparatus 18 are arranged in this case at a safe distance from both the control unit 37 and the operator 38 during the rotation of the displacing apparatus 18, as schematically illustrated in dotted line in FIG. 1.

Once these substantially simultaneous positioning steps of the first auxiliary drum 19 at the second working position B and of the second auxiliary drum at the picking position C (in this case coinciding with the first working position A) have been carried out, the finishing station 17 is in an operating condition in which:

i) a substantially cylindrical sleeve including the second belt structure 4 and the tread band 5 ready to be removed from the second auxiliary drum 20 is arranged at the picking position C (in this case coinciding with the same working position A); and ii) the first belt structure 4 previously assembled at the first working position A is supported by the first auxiliary drum 19 and is ready to receive a new tread band 5 at the second working position B.

At this point, the method of the invention provides for the step of transferring the substantially cylindrical sleeve from the picking position C of the finishing station 17 at a radially outer position with respect to the carcass structure 3 built in the meantime in the building station 14.

Advantageously, this transfer step is carried out by the substantially ring-shaped transfer device 36 according to methods known per se in the art.

After said transfer step, the finishing station 17 is at an operating condition in which the second auxiliary drum 20 is already arranged at the first working position A and ready to support a new belt structure 4 thanks to the operating interaction with the application apparatus 21 arranged at said working position A.

Once the operations described above are carried out, therefore, the finishing station 17 is at an operating conditions totally similar to the starting condition indicated above, except for the fact that the two auxiliary drums 19, 20 have exchanged their position.

At this point, the method of the invention provides for cyclically repeating the steps described above which are adapted to manufacture the substantially cylindrical sleeve including the belt structure 4 and the tread band 5, by assembling a new belt structure 4 on the second auxiliary drum 20 at the first working position A, by applying substantially simultaneously at the second working position J? a new tread band 5 at a radially outer position with respect to the belt structure 4 previously assembled on the first auxiliary drum 19, exchanging the place of the two drums at the end of these assembling and application steps, and so on.

At the end of each cyclical repetition of said steps, a new substantially cylindrical sleeve including the belt structure 4 and the tread band 5 is obtained, supported at the picking position C (in this case position A) alternatively by one of the two auxiliary drums 19, 20 of the finishing station 17.

Such sleeve is then transferred from the picking position C of the finishing station 17 at a radially outer position with respect to a new carcass structure 3 built in the building station 14 according to the method described above.

Preferably, the steps of manufacturing the substantially cylindrical sleeve including the tread band 5 and the belt structure 4 and of transferring such sleeve from the picking position C of the finishing station 17 are carried out in a time interval substantially equal to or smaller than, the time for carrying out the step of building the carcass structure 3 in the building station 14.

In this way, it is advantageously possible to manufacture and transfer the substantially cylindrical sleeve including the tread band 5 and the belt structure 4 in the cycle time used to built the carcass structure 3 in the building station 14 optimising the process times and increasing the productivity of the manufacturing plant 1.

In a particularly preferred embodiment of the invention, the assembly of the substantially cylindrical sleeve including the tread band 5 and the belt structure 4 with the carcass structure 3 not toroidally shaped yet (otherwise called "carcass sleeve") is carried out on the same primary drum 15 of the building station 14 used for building the carcass sleeve, thus integrating a unistage manufacturing process.

Advantageously, a high quality level of the tyre 2 being manufactured is ensured in this way, thanks to the limited number of operations during the assembly of green semifinished products still in a substantially plastic state. Such semifinished products are thus subjected to a correspondingly limited number of potentially deforming stresses, thus advantageously limiting the risk of undesired structural alterations of the green tyre being manufactured.

Within the framework of said unistage manufacturing process, the transfer device 36 having a substantially annular conformation is operated so as to be placed around the auxiliary drum 19 or 20 arranged at the picking position C for picking up the substantially cylindrical sleeve including the belt structure 4 and the tread band 5 from the same drum. In a way known per se, the auxiliary drum 19, 20 disengages said sleeve which is then axially translated by the transfer device 36 to be placed in a coaxially centred position on the primary drum 15 supporting the carcass sleeve.

Alternatively, the assembly of the carcass sleeve with the tread band 5/belt structure 4 sleeve may be carried out on a so-called shaping drum onto which the carcass sleeve and the tread band 5/belt structure 4 sleeve are transferred, to manufacture the tyre according to a so-called "two-stage manufacturing process".

In a preferred embodiment, the method further comprises after said transfer step the step of shaping the substantially cylindrical carcass structure 3 according to a substantially toroidal shape so as to associate the same to the substantially cylindrical sleeve including the tread band 5 and the belt structure 4 transferred at a radially outer position with respect to the carcass structure.

Preferably, this shaping step is carried out by axially moving the annular anchoring structures 7 close to each other and simultaneously admitting fluid under pressure into the assembly consisting of the carcass structure 3 and of the substantially cylindrical sleeve including the tread band 5 and the belt structure 4, so as to place the carcass ply(ies) 10 in contact against the inner surface of the belt structure 4 held by the transfer device 36.

In this way, a green tyre is manufactured which can be removed from the primary drum or from the shaping drum to be subjected to a usual vulcanisation step carried out in a vulcanisation station (not shown) of a plant for making a tyre (not shown) comprising the manufacturing plant 1 described above.

Clearly, the method and the apparatus described above allow to manufacture a tyre 2 having a different structure, for example by applying further layers or elements at the first working position A and/or at the second working position B and/or at the picking position C.

All this can be obtained by positioning at such positions suitable delivery equipment adapted to operatively interact with the auxiliary drums 19, 20 arranged therein by the 5 displacing apparatus 18.

Thus, for example, in an alternative embodiment, the method of the invention may provide for the further step of applying at the picking position C (for example coinciding with the first working position A) at a radially outer position with respect to the belt structure 4 supported by the auxiliary drum 19, 20 arranged therein, an additional first or last continuous elongated element of green elastomeric material according to a respective predetermined path, so as to begin or complete the tread band at the picking position C.

In this case, it is advantageously possible to form the tread hand 5 using three different elastomeric materials delivered by. the delivery members 25, 26 arranged at the second 15 working position B and by the delivery member arranged at the picking position C of the finishing station 17.

Preferably, this application step is carried out according to the methods described above, that is, by delivering such continuous elongated element by means of an extruder of a further delivery member (not shown) arranged at the picking position C (for example coinciding with the first working position A) near the auxiliary drum 19, 20 arranged therein and by winding the continuous elongated element on said drum.

Also in this case, such winding is accomplished by carrying out, simultaneously with the application of the continuous elongated element, the steps of:

imparting to the auxiliary drum 19 or 20 carrying the belt structure 4 a rotary motion about a geometric axis thereof, so as to circumferentially distribute the continuous elongated element at a radially outer position with respect to the belt structure 4;

carrying out controlled relative displacements between the auxiliary drum 19 or 20 and the delivery member to form with the continuous elongated element a plurality of coils arranged in mutual side by side relationship to define at least one portion of the tread band 5.

Advantageously, this further delivery member may be provided with a respective actuating group (not shown) adapted to move such member to and from the auxiliary drum 19, 20 arranged at the picking position C (for example coinciding with the first working position A), so as not to interfere with the subsequent picking operations of the substantially cylindrical sleeve including the belt structure 4 and the tread band 5.

From repeated tests carried out by the Applicant, it has been found that the manufacturing method and apparatus according to the invention, in their possible alternative embodiments, fully achieve the object of manufacturing a high quality tyre reconciling the different productivity rates of the building station 14 of the carcass structure and of the finishing station 17 intended to manufacture the substantially cylindrical sleeve including a belt structure 4 provided with at least a belt layer and with a tread band 5 formed by winding coils of at least one continuous elongated element.

In addition, it should be noted that the method according to the invention achieves the aforementioned object thanks to a sequence of operating steps that can be carried out by a structurally simple and easy to manage manufacturing plant 1.

Advantageously, the manufacturing plant 1 of the invention can be arranged downstream of an existing station for building the carcass structures; thus increasing the productivity of the tyre manufacturing plant which incorporates the same.

Advantageously, moreover, the assembly of the carcass sleeve with the outer belt structure/tread band sleeve can be carried out on the same drum used for building the carcass sleeve, integrating a unistage manufacturing process which makes it possible to maximise the productivity of the manufacturing plant and the quality characteristics of the tyres manufactured by the same.

Finally, it should be observed that the number of auxiliary drums and of the working positions defined in the finishing station 17 can be higher than two depending upon specific application requirements.

In this case, the auxiliary drums will be preferably supported by the displacing apparatus 18 at positions angularly offset with each other by an angle substantially equal to about 360°/n where n is the total number of auxiliary drums.

In this case, the plant 1 comprises a suitable number of application apparatuses 21 of the belt layers and/or of delivery members of respective continuous elongated elements arranged at the working positions defined in the finishing station 17 for operatively interacting with the auxiliary drums arranged therein by the displacing apparatus 18.

The invention claimed is:

1. A plant for manufacturing tyres for vehicle wheels comprising:
    a) a building station for building a substantially cylindrical carcass structure comprising at least one carcass ply operatively associated with annular anchoring structures axially spaced apart from each other;
    b) a finishing station for manufacturing a substantially cylindrical sleeve comprising a tread band applied at a radially outer position with respect to a belt structure comprising at least one belt layer, said finishing station comprising:
        b1) a first auxiliary drum;
        b2) a second auxiliary drum;
        b3) a turret-like displacing apparatus adapted to slidably support said auxiliary drums and to position said auxiliary drums at a first working position wherein said belt structure is assembled, at a second working position wherein said tread band is applied, and at a picking position of said substantially cylindrical sleeve; the first and said second working positions being angularly offset with respect to one another within the finishing station, wherein the turret-like displacing apparatus comprises a supporting carriage slidably mounted on a rotatable supporting platform of the turret-like displacing apparatus; and
        b4) at least two delivery members for delivering a first and a second continuous elongated element, respectively, of green elastomeric material, the delivery members being arranged at said second working position for operatively interacting with one of said auxiliary drums,
        wherein the turret-like displacing apparatus further comprises at least one drum translating unit adapted to translate one of said auxiliary drums between said working positions or said picking position and a stand-by position defined between said working positions or picking position and a rotation axis of the displacing apparatus, the stand-by position being defined between said working positions or picking position and a rotation axis of the displacing apparatus, and defined within an outer perimeter of the rotatable supporting platform; and
    c) at least one transfer device of the substantially cylindrical sleeve manufactured in the finishing station adapted to operatively interact with one of said auxiliary drums at said picking position for transferring said substantially cylindrical sleeve at a radially outer position with respect to a carcass structure built in the building station.

2. The plant according to claim 1, further comprising at least one delivery device of belt layers arranged at said first working position for operatively interacting with one of said auxiliary drums.

3. The plant according to claim 1, further comprising at least one delivery device of a strip-like element of green elastomeric material comprising at least one reinforcing cord arranged at said first working position for operatively interacting with one of said auxiliary drums to form a belt layer comprising reinforcing cords substantially parallel to the circumferential development direction of the sleeve.

4. The plant according to claim 1, comprising at least one further delivery device of a belt layer comprising a plurality of reinforcing cords arranged at said first working position for operatively interacting with one of said auxiliary drums.

5. The plant according to claim 1, further comprising at least one third delivery member of a respective third continuous elongated element of green elastomeric material arranged at said picking position for operatively interacting with one of said auxiliary drums.

6. The plant according to claim 1, wherein the delivery members of said continuous elongated elements comprise at least one extruder.

7. The plant according to claim 1, wherein at least one of said delivery members of the continuous elongated elements delivers said continuous elongated element as a semifinished product of green elastomeric material in the form of a continuous strip.

8. The plant according to claim 1, wherein said displacing apparatus comprises at least one drum rotation unit adapted to rotate the auxiliary drums about a geometrical axis thereof.

9. The plant according to claim 1, further comprising at least one driving unit adapted to rotate said displacing apparatus about a substantially vertical rotation axis.

10. The plant according to claim 1, wherein said delivery members of the continuous elongated elements are arranged at said second working position for operatively interacting at opposite sides of one of said auxiliary drums.

11. The plant according to claim 1, wherein the picking position of the cylindrical sleeve substantially coincides with said first working position.

12. The plant according to claim 1, further comprising at least one apparatus for shaping said carcass structure according to a substantially toroidal shape so as to associate the substantially cylindrical sleeve comprising the belt structure and the tread band with said carcass structure.

13. A plant for making tyres for vehicle wheels, comprising a manufacturing plant according to claim 1, and at least one vulcanisation station for vulcanising the tyres obtained in said manufacturing plant.

14. A plant for manufacturing tyres for vehicle wheels comprising:
 a) a building station for building a substantially cylindrical carcass structure comprising at least one carcass ply operatively associated with annular anchoring structures axially spaced apart from each other;
 b) a finishing station for manufacturing a substantially cylindrical sleeve comprising a tread band applied at a radially outer position with respect to a belt structure comprising at least one belt layer, said finishing station comprising:
  b1) a first auxiliary drum;
  b2) a second auxiliary drum;
  b3) a turret-like displacing apparatus adapted to slidably support said auxiliary drums and to position said auxiliary drums at a first working position wherein said belt structure is assembled, at a second working position wherein said tread band is applied, and at a picking position of said substantially cylindrical sleeve; the first and said second working positions being angularly offset with respect to one another within the finishing station, wherein the turret-like displacing apparatus comprises a supporting carriage slidably mounted on a rotatable supporting platform of the turret-like displacing apparatus; and
  b4) at least two delivery members for delivering a first and a second continuous elongated element, respectively, of green elastomeric material, the delivery members being arranged at said second working position for operatively interacting with one of said auxiliary drums,
  wherein the turret-like displacing apparatus further comprises at least one drum translating unit adapted to carry out controlled relative displacements between one of the auxiliary drums and the delivery members to form with said first and second continuous elongated elements a plurality of contiguous circumferential coils, the translating unit further adapted to translate one of said auxiliary drums between said working positions or said picking position and a stand-by position, the stand-by position being defined between said working positions or picking position and a rotation axis of the displacing apparatus, and defined within an outer perimeter of the rotatable supporting platform; and
 c) at least one transfer device of the substantially cylindrical sleeve manufactured in the finishing station adapted to operatively interact with one of said auxiliary drums at said picking position for transferring said substantially cylindrical sleeve at a radially outer position with respect to a carcass structure built in the building station.

15. The plant according to claim 14, further comprising at least one delivery device of belt layers arranged at said first working position for operatively interacting with one of said auxiliary drums.

16. The plant according to claim 14, further comprising at least one delivery device of a strip-like element of green elastomeric material comprising at least one reinforcing cord arranged at said first working position for operatively interacting with one of said auxiliary drums to form a belt layer comprising reinforcing cords substantially parallel to the circumferential development direction of the sleeve.

17. The plant according to claim 14, comprising at least one further delivery device of a belt layer comprising a plurality of reinforcing cords arranged at said first working position for operatively interacting with one of said auxiliary drums.

18. The plant according to claim 14, further comprising at least one third delivery member of a respective third continuous elongated element of green elastomeric material arranged at said picking position for operatively interacting with one of said auxiliary drums.

19. The plant according to claim 14, wherein the delivery members of said continuous elongated elements comprise at least one extruder.

20. The plant according to claim 14, wherein at least one of said delivery members of the continuous elongated elements delivers said continuous elongated element as a semifinished product of green elastomeric material in the form of a continuous strip.

21. The plant according to claim 14, wherein said displacing apparatus comprises at least one drum rotation unit adapted to rotate the auxiliary drums about a geometrical axis thereof.

22. The plant according to claim 14, further comprising at least one driving unit adapted to rotate said displacing apparatus about a substantially vertical rotation axis.

23. The plant according to claim 14, wherein said delivery members of the continuous elongated elements are arranged at said second working position for operatively interacting at opposite sides of one of said auxiliary drums.

24. The plant according to claim 14, wherein the picking position of the cylindrical sleeve substantially coincides with said first working position.

25. The plant according to claim 14, further comprising at least one apparatus for shaping said carcass structure according to a substantially toroidal shape so as to associate the substantially cylindrical sleeve comprising the belt structure and the tread band with said carcass structure.

26. A plant for making tyres for vehicle wheels, comprising a manufacturing plant according to claim 14, and at least one vulcanisation station for vulcanising the tyres obtained in said manufacturing plant.

* * * * *